(12) United States Patent
Sasaki et al.

(10) Patent No.: US 11,299,170 B2
(45) Date of Patent: Apr. 12, 2022

(54) PASSENGER SUPPORT DEVICE, PASSENGER SUPPORT METHOD AND PROGRAM STORAGE MEDIUM

(71) Applicant: Toyota Jidosha Kabushiki Kaisha, Toyota (JP)

(72) Inventors: Akira Sasaki, Miyoshi (JP); Eisuke Ando, Nagoya (JP); Misako Hayashima, Okazaki (JP); Saki Kitoh, Okazaki (JP); Masahiro Yamashita, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 263 days.

(21) Appl. No.: 16/266,443

(22) Filed: Feb. 4, 2019

(65) Prior Publication Data

US 2019/0241193 A1 Aug. 8, 2019

(30) Foreign Application Priority Data

Feb. 6, 2018 (JP) .............................. JP2018-019561

(51) Int. Cl.
*B60W 50/00* (2006.01)
*B60W 50/10* (2012.01)
(Continued)

(52) U.S. Cl.
CPC .......... *B60W 50/0098* (2013.01); *B25J 11/00* (2013.01); *B25J 11/008* (2013.01);
(Continued)

(58) Field of Classification Search
CPC ............. B60W 50/0098; B60W 50/10; B60W 2710/30; B60W 30/18; B60W 30/182;
(Continued)

(56) References Cited

U.S. PATENT DOCUMENTS

| 2009/0112462 A1* | 4/2009 | Lo ........................... G01C 21/34 701/533 |
| 2012/0035925 A1* | 2/2012 | Friend ..................... G06F 3/167 704/235 |

(Continued)

FOREIGN PATENT DOCUMENTS

| JP | 2002-166379 A | 6/2002 |
| JP | 2012-123534 A | 6/2012 |

(Continued)

*Primary Examiner* — James J Lee
*Assistant Examiner* — Alexander George Matta
(74) *Attorney, Agent, or Firm* — Dinsmore & Shohl LLP (57) ABSTRACT

There is provided a passenger support device including (i) an informing portion that sets behavior items to be performed by a passenger by a time a vehicle arrives at a destination and sets an order of performing the behavior items, the informing portion informing the passenger of the behavior items to be performed based on the order, (ii) an action recognition portion that recognizes an action of the passenger performing the behavior items, and (iii) an action support portion that supports the action of the passenger performing the behavior items, based on each of the behavior items and the action of the passenger recognized by the action recognition portion.

13 Claims, 7 Drawing Sheets

(51) Int. Cl.
*B25J 11/00* (2006.01)
*G05D 1/02* (2020.01)

(52) U.S. Cl.
CPC ......... *B60W 50/10* (2013.01); *B60W 2710/30* (2013.01); *G05D 1/021* (2013.01)

(58) Field of Classification Search
CPC .... B60W 30/08; B60W 40/08; B60W 40/105; B60W 40/10; B60W 50/14; B60W 2050/143; B60W 2050/146; B25J 11/00; B25J 11/008; G05D 1/021; B60K 2370/1868; B60K 2370/63; B60K 2370/67; B60K 2370/175; B60K 37/04; B60K 35/00; B60K 2370/161
See application file for complete search history.

(56) References Cited

U.S. PATENT DOCUMENTS

| | | | | |
|---|---|---|---|---|
| 2012/0254763 | A1* | 10/2012 | Protopapas | G06Q 10/1097 715/738 |
| 2013/0117060 | A1* | 5/2013 | Henriksen | G06Q 10/1095 705/7.21 |
| 2016/0248847 | A1* | 8/2016 | Saxena | H04L 12/2829 |
| 2017/0108864 | A1* | 4/2017 | Wiklinska | B60W 60/0051 |
| 2017/0193627 | A1* | 7/2017 | Urmson | G08G 1/202 |
| 2017/0282365 | A1* | 10/2017 | Erhart | H04W 12/0608 |
| 2018/0181919 | A1* | 6/2018 | Jobling | B64D 13/06 |
| 2019/0043001 | A1* | 2/2019 | Woulfe | G06Q 10/083 |

FOREIGN PATENT DOCUMENTS

| | | |
|---|---|---|
| JP | 2015-176338 A | 10/2015 |
| WO | 2015/145142 A1 | 10/2015 |

* cited by examiner

PASSENGER SUPPORT DEVICE, PASSENGER SUPPORT METHOD AND PROGRAM STORAGE MEDIUM

CROSS-REFERENCE TO RELATED APPLICATION

This application claims priority under 35 USC 119 from Japanese Patent application No. 2018-019561 filed on Feb. 6, 2018, the disclosure of which is incorporated by reference herein in its entirety.

BACKGROUND

Technical Field

The present disclosure relates to a passenger support device, a passenger support method and a program storage medium for supporting behavior of a passenger in a vehicle cabin.

Related Art

A technique disclosed in Japanese Patent Application Laid-Open (JP-A) No. 2012-123534 proposes a behavior support system that acquires behavior pattern information of or action pattern information of a user by using positional information of a portable terminal carried by the user or a mobile terminal such as an on-vehicle terminal mounted on a vehicle used by the user and provides service information corresponding to the acquired behavior pattern information or the acquired action pattern information.

In the behavior support system disclosed in JP-A No. 2012-123534, standard behavior pattern information is defined in accordance with each destination, and when the behavior pattern information of the vehicle is acquired, the service information relating to the destination of the standard behavior pattern information to which the acquired behavior pattern information corresponds, is displayed on the mobile terminal of the vehicle.

Further, the behavior support system disclosed in JP-A No. 2012-123534 supports the behavior of the user by acquiring the action pattern information of the user and the time and by displaying the service information corresponding to the standard behavior pattern information defined by the acquired operation pattern information and the acquired time, on the portable terminal of the user.

In an automatic driving mode, when the destination is set, steering control, speed control, and brake control of a vehicle are performed, so that the vehicle travels to the set destination. In the vehicle travelling in the automatic driving mode, a passenger in a vehicle cabin is released from driving operation of the vehicle. In vehicle commuting by using the vehicle travelling in such an automatic driving mode, since the passenger is released from the driving operation of the vehicle, the passenger might waste time in the vehicle cabin. Thus, in the vehicle travelling in the automatic driving mode, it is desired to support the passenger to use time effectively in the vehicle cabin.

SUMMARY

The present disclosure provides a passenger support device, a passenger support method, and a program storage medium that a passenger can effectively use a time spent in a vehicle cabin of a vehicle travelling in an automatic driving mode.

A first aspect of the present disclosure is a passenger support device including an informing portion that sets behavior items to be performed by a passenger by a time a vehicle arrives at a destination and sets an order of performing the behavior items, the informing portion informing the passenger of the behavior items to be performed based on the order, an action recognition portion that recognizes an action of the passenger performing the behavior items, and an action support portion that supports the action of the passenger performing the behavior items, based on each of the behavior items and the action of the passenger recognized by the action recognition portion.

In the first aspect described above, the behavior items to be performed by the passenger by the time the vehicle arrives at the destination and the performing order of the behavior items are set, and the informing portion informs the passenger of the behavior item to be performed at the set performing order. Further, the action recognition portion recognizes the action of the passenger performing the behavior items, and the action support portion supports the action of the passenger performing the behavior items, based on the behavior item to be performed by the passenger and the action of the passenger performing the behavior item.

Accordingly, the action support portion support the action of the passenger, and thereby the passenger can perform the action of the behavior item in a limited space in a vehicle cabin and can use the time effectively in the vehicle travelling to the destination in an automatic driving mode.

In a passenger support device of a second aspect of the present disclosure, in addition to the first aspect described above, the informing portion indicates a behavior item to be performed next after performing each of the behavior items is finished.

In the second aspect of the present disclosure, the informing portion informs the behavior item to be performed next after performing of each of the informed behavior items is finished. Accordingly, the passenger can perform the set behavior items in good order further efficiently, and therefore the passenger can use the time further effectively.

In a passenger support device of a third aspect of the present disclosure, in addition to the first or the second aspect described above, the informing portion indicates each of the behavior items by display on a display medium and by sound output from a sound output portion.

In the third aspect, the informing portion informs the behavior item to be performed by the display on the display medium and by the sound output from the sound output portion. Accordingly, the passenger can appropriately recognize the behavior (behavior item) to be performed to use the time effectively.

In a passenger support device of a fourth aspect of the present disclosure, in addition to the first to the third aspects, the informing portion further includes a receiving portion that receives input indicating addition, removal, and a order of the behavior items to be performed, from the passenger; and a behavior setting portion that sets the behavior items to be performed and the order of performing the behavior items based on the information received by the receiving portion.

In the fourth aspect, the receiving portion receives each information of the addition, the removal, and the performing order of the behavior items to be performed, from the passenger, and the behavior setting portion sets the behavior items to be performed and the performing order of the behavior items based on the information received by the receiving portion. Accordingly, the behavior items to be performed and the performing order can be easily set in accordance with a preference of the passenger.

A passenger support device of a fifth aspect of the present disclosure, in addition to the fourth aspect, includes an acquisition portion that acquires a required time when the vehicle arrives at the destination, and the behavior setting portion sets the behavior items to be performed such that the behavior items are finished by the required time.

In the fifth aspect, the acquisition portion acquires the required time when the vehicle travels to the destination, and the behavior setting portion sets the behavior items to be performed such that the behavior items are finished by the time the vehicle arrives at the destination. Accordingly, the passenger can perform the behavior item while further effectively using the time until the vehicle arrived at the destination.

In a passenger support device of a sixth aspect of the present disclosure, in addition to the fourth or the fifth aspect, the receiving portion receives the input indicating addition, the removal, and the performing order of the behavior items to be performed on an interactive basis.

In the passenger support device of the sixth aspect of the present disclosure, the receiving portion receives the setting of the addition, the removal, and the performing order of the behavior items to be performed on an interactive basis. Accordingly, the passenger can set the addition, the removal, and the performing order of the behavior items to be performed easily.

In a passenger support device of a seventh aspect of the present disclosure, in addition to the first to the sixth aspects, the action support portion includes a robot arm that supports the action of the passenger performing one of the behavior items.

In the seventh aspect, the robot arm supports the action of the passenger performing the behavior item. Accordingly, the passenger can perform the behavior item in a limited space in the vehicle cabin.

In a passenger support device of an eighth aspect of the present disclosure, in addition to the seventh aspect, the robot arm is activated in accordance with the behavior item and the action of the passenger recognized by the action recognition portion.

In the eighth aspect, the robot arm is activated in accordance with the behavior item and the action of the passenger recognized by the action recognition portion. Accordingly, the action of the passenger can be supported as if a human supports the passenger, and therefore the passenger can perform the behavior item efficiently and can use the time further effectively.

A ninth aspect of the present disclosure is a passenger support method, including setting behavior items to be performed by a passenger by the time when a vehicle arrives at a destination and setting an order of performing the behavior items, informing the passenger of the behavior items to be performed based on the order, recognizing an action of the passenger performing the behavior items, and supporting the action of the passenger performing the behavior items, based on each of the behavior items and the recognized action of the passenger.

A tenth aspect of the present disclosure is a non-transitory storage medium that stores a program causing a computer to execute a passenger support processing, the processing including setting behavior items to be performed by a passenger, by a time a vehicle arrives at a destination and setting an order of performing the behavior items, informing the passenger of the behavior items to be performed based on the order, recognizing an action of the passenger performing the behavior items, and supporting the action of the passenger performing the behavior items, based on each of the behavior items and the recognized action of the passenger.

As described above, according to the present disclosure, a passenger of a vehicle travelling in an automatic driving mode can effectively use a time in a limited space in a vehicle cabin.

BRIEF DESCRIPTION OF THE DRAWINGS

Exemplary embodiments of the present disclosure will be described in detail based in the following figures, wherein.

DETAILED DESCRIPTION

Hereinafter, one example of an embodiment of the present disclosure is described in detail with reference to the drawings.

Figure 1:
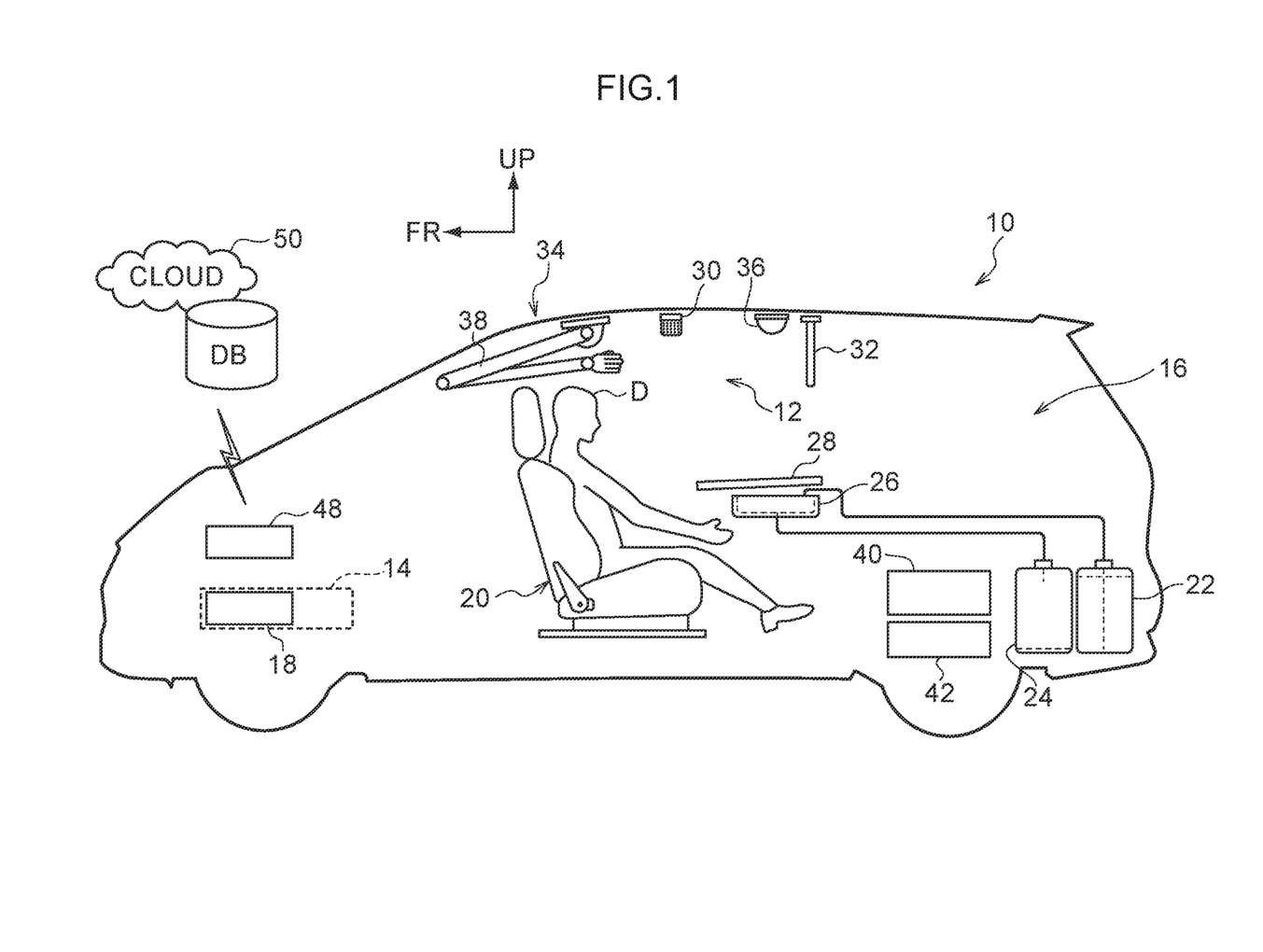
FIG. 1 is a schematic configuration view of a vehicle according to the present embodiment.
Figure 2:
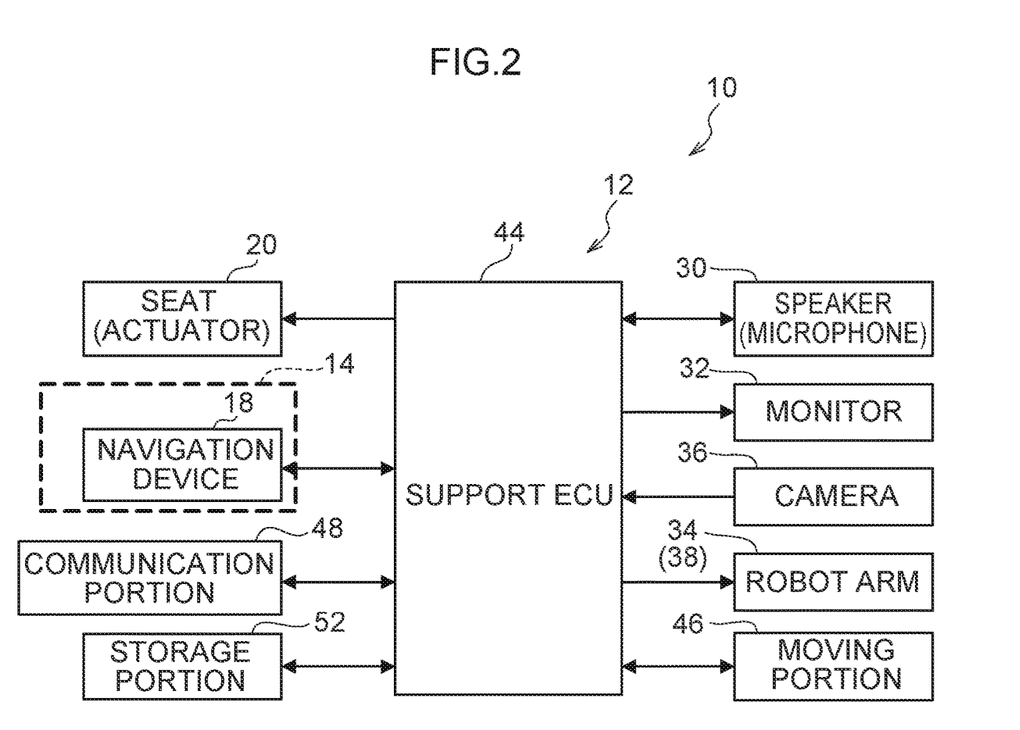
FIG. 2 is a schematic configuration view of a passenger support device according to the present embodiment.

FIG. 1 shows a schematic view of a main part of a vehicle 10 as a passenger support vehicle according the present embodiment seen from an outer side in a vehicle width direction. FIG. 2 shows a block diagram of a schematic configuration of a passenger support device 12 mounted on the vehicle 10. Here, in FIG. 1, a front side of the vehicle is shown by an arrow FR, and an upper side is shown by an arrow UP.

As shown in FIG. 1, a driving support device 14 is arranged in the vehicle 10 according to the present embodiment. The vehicle 10 can travel in a manual driving mode in which a driver D performs driving operation and in an automatic driving mode in which the driving support device 14 performs travelling control. Further, a passenger support device 12 according to the present embodiment supports behavior of the driver D in a vehicle cabin 16 of the vehicle travelling in the automatic driving mode.

The driving support device 14 includes a vehicle exterior monitoring device (not illustrated) and a navigation device 18 served as a route setting portion and an acquisition portion. The vehicle exterior monitoring device of the driving support device 14 includes a plurality of imaging portions such as a camera that images a periphery of the vehicle including a travelling direction (a front side of the vehicle) of the vehicle, a measuring portion such as a millimeter wave radar (or an ultrasonic sonar) that measures distances between objects (other vehicle, object, human, or the like) around the vehicle (each component is not illustrated) and the measuring portion, and the like. The vehicle exterior monitoring device analyses a white line that shows a lane on a road, a travelling position of the vehicle on the road, an object around the vehicle, a direction of the object, a relative moving direction of the object, a distance to the object, a relative speed to the object, and the like based on an image imaged by the imaging portion and a measurement result of the measuring portion so as to generate travelling environment information in travelling in the automatic driving mode.

The navigation device 18 acquires GPS (Global Positioning System) information and travelling information such as speed, acceleration, a travelling distance and the like of the vehicle so as to specify a position, a travelling direction, and the like of the vehicle based on the GPS information and the travelling information. Further, when the destination is set, the navigation device 18 sets a travelling route to the destination and calculates the required time to the destination from the current place of the vehicle 10.

When the vehicle 10 travels in the automatic driving mode, the driving support device 14 performs steering control, speed control, and brake control of the vehicle 10 based on the travelling environment information analyzed by the vehicle exterior monitoring device so as to make the vehicle 10 travel along the travelling route. Further, the driving support device 14 can be switched from the automatic driving mode to the manual driving mode based on the request of the driver D or the like. When the driving support device 14 is switched to the manual driving mode, the vehicle 10 travels based on driving operation such as operation of a steering (not illustrated) by a passenger.

A seat 20 on which the driver D is seated is arranged in the vehicle cabin 16 of the vehicle 10. The seat 20 is rotatable around a vertical direction when a actuator, which is not illustrated, is activated. Accordingly, in a driving position in which the seat 20 is directed to the front side of the vehicle, the driver D seated on the seat 20 can perform the driving operation of the vehicle 10. Further, a support position is defined by a rotated position in which the seat 20 is rotated to direct to a rear side of the vehicle. When the seat 20 is set in the support position, a relatively large space is secured in front of the driver D seated on the seat 20. When the vehicle 10 travels in the automatic driving mode, the seat 20 can be rotated to direct to the support position (the rear side of the vehicle).

The passenger support device 12 includes a water supply tank 22, a waste water tank 24, a tray (face washing tray) 26 formed in a container shape with a shallow bottom, a table 28 formed in a substantially flat shape, and the like that form an action support portion. The water supply tank 22, the waste water tank 24, the tray 26, and the table 28 are arranged in the vehicle 10. Each of the tray 26 and the table 28 is movable between a support position arranged in the vehicle cabin 16 and a storage position (not illustrated) retracted from the vehicle cabin 16. The support position of each of the tray 26 and the table 28 is arranged at a front side of the driver D seated on the seat 20 when the seat 20 is positioned at the support position.

When the table 28 is positioned at the support position, the driver D can use the table 28 for hand writing or the like. Further, the water supply tank 22 and the waste water tank 24 are connected to the tray 26, and when the tray 26 is positioned at the support position and a faucet, which is not illustrated, is turned on, water in the water supply tank 22 flows into the tray 26 from the faucet. The water flowing from the faucet is retrieved in the tray 26 and stored in the waste water tank 24. With this, in the vehicle 10, when the tray 26 is moved to the support position, the driver D can perform face washing or the like.

Further, the passenger support device 12 includes a speaker 30 as a voice output portion that forms an informing portion, a monitor 32 as a display portion that forms the informing portion together with the speaker 30, a robot arm 34 served as the action support portion, and a camera 36 formed in a dome shape served as an imaging portion that forms an action recognition portion.

The speaker 30 is mounted to, for example, a ceiling surface of the vehicle cabin 16. The speaker 30 includes a microphone (not illustrated). The speaker 30 emits a sound such as a voice corresponding to an electric signal and converts a voice of the driver D or the like received by using the microphone into the electric signal.

An organic EL panel or a liquid crystal panel is adopted as the monitor 32. The monitor 32 is arranged on, for example, a ceiling of the vehicle cabin 16. The monitor 32 is movable between a support position protruded into the vehicle cabin 16 and a storage position (not illustrated) retracted from the vehicle cabin 16. When the monitor 32 is positioned at the support position, the driver D seated on the seat 20 set in the support position can see a display image.

The robot arm 34 includes a pair of left and right arms 38. The robot arm 34 (arm 38) is mounted to the ceiling surface of the vehicle cabin 16. The robot arm 34 is movable on the ceiling surface in a front-rear direction and a vehicle width direction (a direction crossing both of the front direction and the upper direction of the vehicle). Further, the robot arm 34 is rotatable around the vertical direction. The robot arm 34 includes a plurality of actuators arranged to each arm 38. When the actuator is activated, the arm 38 can perform an action similar to an arm of a human. Further, a magic hand (not illustrated) is arranged at a distal end of the arm 38. When the actuator is activated, the magic hand can perform an action similar to a hand (fingers) of a human. Further, when the action of the robot arm 34 is stopped, the robot arm 34 is stored in a storage position retracted from the vehicle cabin 16 (not illustrated).

The camera 36 is arranged on the ceiling surface of the vehicle cabin 16. The camera 36 can take images in the vehicle cabin 16 at a substantially whole circumference (360°) around the vertical direction from the ceiling surface. With this, the camera 36 can take images of the action of a passenger in the vehicle cabin 16 and the action of the robot arm 34.

Further, a clothes case 40 that stores clothes of the driver D, and a temperature keeping storage 42 that stores foods while keeping a temperature of the foods are arranged in the vehicle 10. The clothes in the clothes case 40 and the foods in the temperature keeping storage 42 can be stored by the driver D and retrieved by using the robot arm 34.

As shown in FIG. 2, a support ECU 44 served as a control portion is arranged in the passenger support device 12. The support ECU 44 is electrically connected to a control portion (not illustrated) of the driving support device 14 and electrically connected to the navigation device 18. Further, the electrical connection in the present embodiment includes a connection of a power source wire for power supply or the like, a connection for transmitting a voltage signal or a current signal by wires, and a network connection by wires or via a wireless communication portion.

Figure 7:
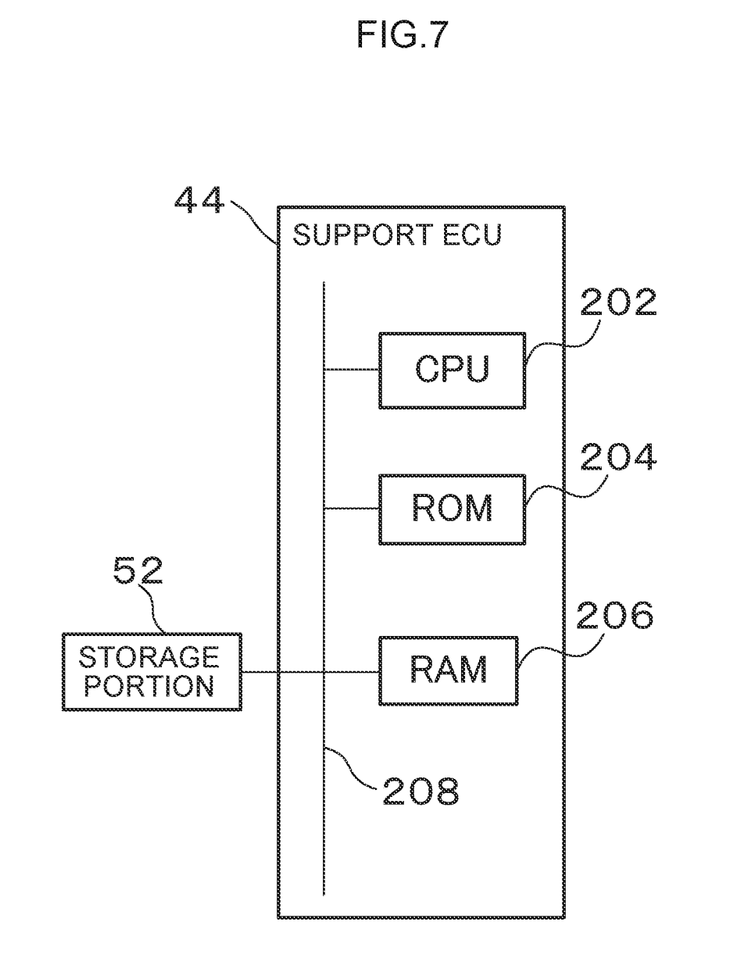
FIG. 7 is a block diagram illustrating a hardware configuration of a support ECU of the passenger support device.

FIG. 7 shows a block diagram of a hardware configuration of the support ECU 44. The support ECU 44 includes a CPU (Central Processing Unit: processor) 202, a ROM (Read Only Memory) 204, and a RAM (Random Access Memory)

206. The support ECU 44 is connected to a storage portion 52. The components are connected in a mutual communication manner via a bus 208.

The CPU 202 is formed as a central processing unit so as to execute various programs and to control each portion. That is, the CPU 202 reads a program from the ROM 204 or the storage portion 52 and executes the program on the RAM 206 as a working area. The CPU 202 performs the control of each portion included in the passenger support device 12 and various arithmetic processing in accordance with the program stored in the ROM 204 or the storage portion 52. In the present embodiment, a passenger support program for performing passenger support by using the passenger support device 12 is stored in the ROM 204 or the storage portion 52.

The ROM 204 stores various programs and various data. The RAM 206 stores the programs or the data temporarily as a working area.

For convenience of explanation, hereinafter, performing various functions of the passenger support device 12 by the CPU 202 of the support ECU 44 executing the passenger support program stored in the ROM 204 or the storage portion 52 is described as that the support ECU 44 controls the passenger support device 12.

The seat 20 (actuator), the speaker 30, the monitor 32, the robot arm 34 (control portion of the robot arm 34), the camera 36, and a moving portion 46 are electrically connected to the support ECU 44. The support ECU 44 moves the tray 26, the table 28, and the monitor 32 to respective support positions and respective storage positions by actuating the moving portion 46. Further, the support ECU 44 controls the movement of the robot arm 34 on the ceiling surface and the action of the arm 38 (driving of the actuator).

Further, a communication portion 48 is arranged in the vehicle 10. The communication portion 48 is electrically connected to the support ECU 44. As shown in FIG. 1, the communication portion 48 is electrically connected to a cloud 50 by a wireless communication portion so that various data can be acquired or various applications can be executed in the cloud 50.

The support ECU 44 adopts an AI (Artificial Intelligence) technology. An AI speaker is formed by the support ECU 44 and the speaker 30 (including the microphone). The support ECU 44 emits a sound (language) from the speaker 30 and detects a voice (language) emitted by the driver D, through the microphone. At this time, the support ECU 44 recognizes a content of the sound spoken by the driver D and generates a sound signal having a predetermined content by using the cloud 50, and the support ECU 44 emits the sound of the generated sound signal from the speaker 30. With this, the support ECU 44 can talk with the driver D. The support ECU 44 informs various types of information for the driver D and performs the setting of the support to the driver D on an interactive basis.

The support ECU 44 controls the passenger support device 12 such that various types of information such as an information image used by the conversation with the driver D are displayed on the monitor 32. Further, the support ECU 44 extracts a target and movement of the target such as the driver D and the robot arm 34 by analyzing the image imaged by the camera 36. The support ECU 44 uses the AI technology to recognize the action of the driver D and the robot arm 34 (movement of the arm 38) from the image imaged by the camera 36, and the support ECU 44 controls the action of the robot arm 34 to support the action of the driver D.

The storage portion 52 is arranged in the passenger support device 12. The storage portion 52 adopts a HDD (Hard Disk Drive) or a nonvolatile storage medium such as a semiconductor memory. The storage portion 52 is electrically connected to the support ECU 44. The information acquired by the support ECU 44 is stored in the storage portion 52.

Hereinafter, the information stored in the storage portion 52 may be stored in the ROM 204 of the support ECU 44 instead of the storage portion 52.

Further, behavior items of the driver D in the vehicle cabin 16 and information relating to the behavior items are stored in the storage portion 52. The behavior item denotes a behavior of the driver D possibly performed in the vehicle cabin 16 by the time the vehicle 10 arrives at the destination. Each behavior item is stored corresponding to each destination.

A history of the behavior items performed for each destination is stored in the storage portion 52. The history includes information relating to the behavior items. The information relating to the behavior items includes a behavior time which is a time required to finish the behavior since the driver D starts (performs) the behavior, a priority of the behavior item, and a performing order among the behavior items. A level of the priority is defined based on the frequency of the behavior in the history. The level of the priority of the behavior item is higher as the frequency of the behavior is higher. Further, the performing order among the behavior items is defined by information of the performing order relating to the behavior item to be performed earlier or to be performed later among the behavior items.

Here, the support ECU 44 sets one or more behavior items to be performed by the driver D by the time the vehicle 10 arrives at the destination. The behavior item stored in the storage portion 52 (the behavior item performed in past) and the behavior item designated by the driver D are set. The navigation device 18 calculates the required time when the vehicle 10 travels to the destination. The support ECU 44 sets the behavior items by selecting the behavior items at a higher priority order based on the behavior item of each destination stored in the storage portion 52 and the information relating to the behavior item such that the performing of the behavior items is finished within the required time. Further, the support ECU 44 sets the behavior items to be performed together with the performing order (the support ECU 44 arranges a schedule).

The support ECU 44 sets an initial list of the behavior items to be performed. The initial list includes the behavior items acquired from the history of each destination and the performing order of the behavior items. The support ECU 44 receives addition, removal and a change of the performing order of the behavior items from the driver D against the initial list. The support ECU 44 receives the addition, the removal and the change of the performing order of the behavior items from the driver D by using the speaker 30 and the microphone arranged in the speaker 30 on an interactive basis. The support ECU 44 changes the behavior items to be performed and the performing order of the behavior items based on the addition, the removal and the change of the performing order of the behavior items received from the driver D and then the support ECU 44 sets the behavior items to be performed and the performing order.

When the vehicle 10 starts to travel toward the destination in the automatic driving mode, the support ECU 44 informs the driver D of the set behavior items successively and invites the driver D to perform the behavior items. Further, the support ECU 44 detects the action of the driver D performing the behavior item from the image imaged by the camera 36 and the support ECU 44 operates the robot arm 34 or the like in accordance with the detected action, so that the action of the driver D is supported by the robot arm 34 or the like.

Further, the support ECU 44 analyzes the action of the driver D performing the behavior items from the image imaged by the camera 36 and the support ECU 44 stores the analysis result in the storage portion 52 to reflect the analysis result to the prediction of the action of the driver D and the operation control of the robot arm 34 when the driver D performs a similar behavior item in the future. Here, the information such as the analysis result may be stored in storage on the cloud 50. Further, a container, which is not illustrated, for small items is arranged in the vehicle 10. The small items and the like used by the driver D when the driver D performs the behavior item stored in the storage portion 52 are housed in the container.

Hereinafter, the behavior support for the driver D by the passenger support device 12 is described with reference to FIG. 3 to FIGS. 6A to 6C. Further, in the description below, a work place (company) of the driver D is set to the destination, and therefore the behavior support for the driver D in so-called vehicle commuting is described.

When the driver D in the vehicle 10 designates the destination, the navigation device 18 sets the travel route and calculates the required time when the vehicle 10 travels to the destination. When the start of the travel is instructed, the vehicle 10 starts to travel to the destination in the automatic driving mode. Further, when the destination is designated, the arrival time is also designated. Accordingly, the navigation device 18 sets the travel route such that the vehicle 10 arrives at the destination by the designated time (before the designated time).

Figure 3:
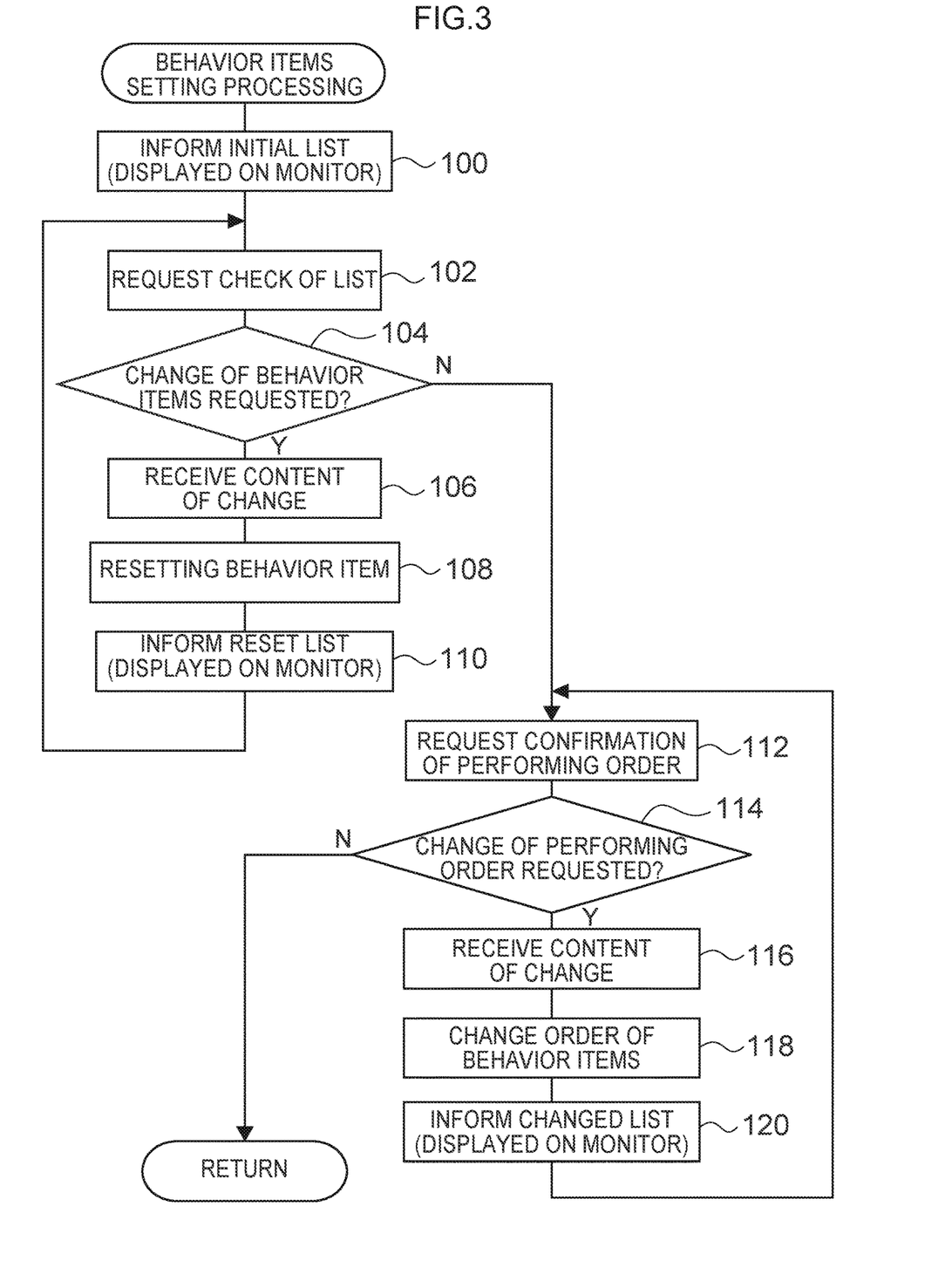
FIG. 3 is a flow chart illustrating a schematic configuration of setting processing of a behavior items as a first step of passenger support processing.

When the vehicle travel in the automatic driving mode is started, the support ECU 44 rotates the seat 20 to the support position. After that, a flow chart shown in FIG. 3 is executed, and the behavior items to be performed by the driver D and the performing order of the behavior items are set (scheduling). Further, the setting of the behavior items may be performed, for example similar to the setting of the destination to the navigation device 18, in a state in which the seat 20 is positioned at the driving position (a state in which the driver D is directed to the front side of the vehicle).

FIG. 3 is a flow chart illustrating a flow of the setting processing of the behavior items by the passenger support device 12 as a first step of the passenger support processing. The CPU 202 of the support ECU 44 reads the passenger support program from the ROM 204 or the storage portion 52, develops the program into the RAM 206 and executes the program, so that the setting processing of the behavior items is performed.

Figure 4:
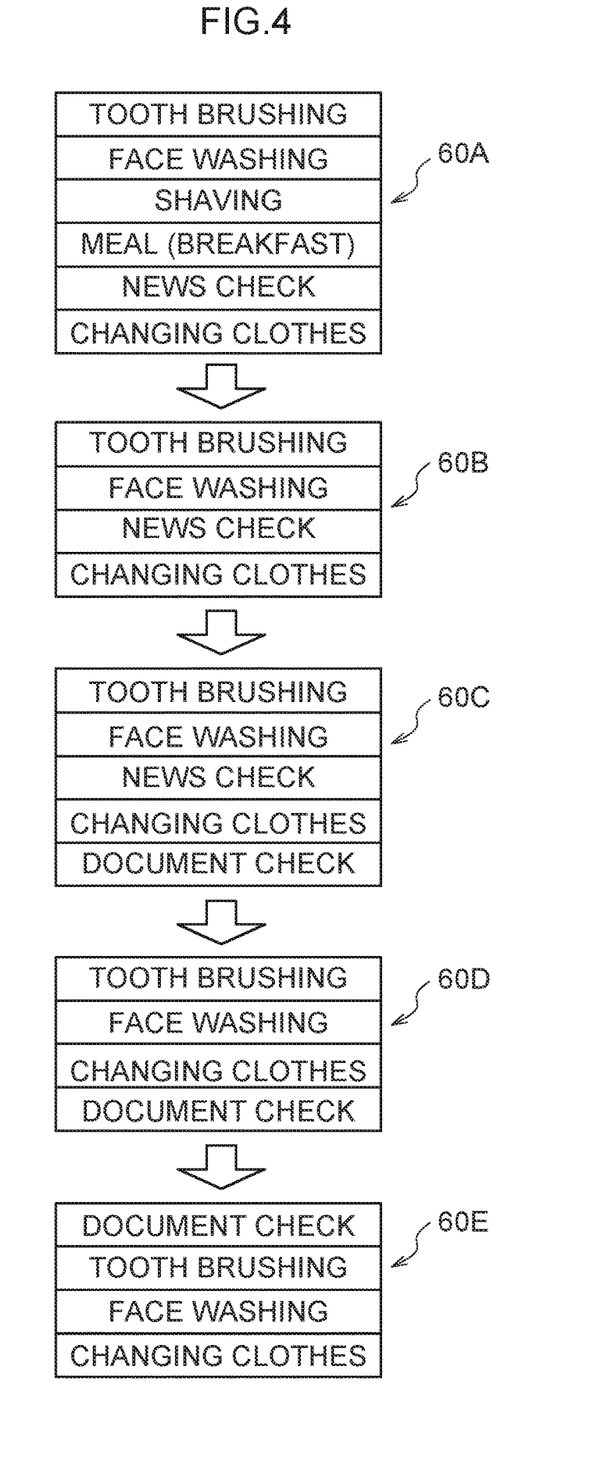
FIG. 4 is a schematic view illustrating a flow of a list changed in accordance with a request of a driver.

In the flow chart shown in FIG. 3, in Step 100, a list of the standard behavior items stored in the storage portion 52 for each destination is informed as the initial list. The initial list is set such that the behavior items are finished within the required time, based on the action time of each behavior item, the priority, and the like. The informing of the initial list may be performed by a sound emitted from the speaker 30, however in the present embodiment, the initial list is displayed on the monitor 32. With this, as shown in FIG. 4, in the commuting to the company as the destination, a list 60A as the initial list of the standard behavior items stored in the storage portion 52 is displayed on the monitor 32.

In the flow chart shown in FIG. 3, in following Step 102, the driver D is invited to confirmation the setting by the sound (language) emitted from the speaker 30, and a response of the voice from the driver D is detected. In Step 104, it is determined whether there is a change or not. Accordingly, in a case in which it is recognized that the driver D requested the change, a positive determination is made in Step 104, and the processing proceeds to Step 106. When the driver D sends a content of the change by the voice, the content of the change is received by receiving the voice emitted by the driver D in Step 106, and the setting of the behavior items is changed based on the received content of the change in Step 108. Further, in Step 110, the driver D is informed by displaying the list of the changed behavior items on the monitor 32.

When the driver D expresses (tells) to delete (not to perform at this time) one or more set items displayed on the monitor 32 by the voice, the support ECU 44 detects the voice emitted by the driver D and recognizes the content of the detected voice, so that the support ECU 44 deletes the behavior items designated by the driver D. For example, in a case in which a breakfast is already done and shaving is not necessary, the driver D expresses that "Meal (breakfast)" and "Shaving" are not necessary through the voice. Consequently, "Meal (breakfast)" and "Shaving" are deleted from the list displayed on the monitor 32. Accordingly, the list 60A shown in FIG. 4 is changed into a list 60B, and the list 60B is displayed on the monitor 32.

Further, in a case in which the driver D has an item (behavior item) to be performed, the driver D expresses the behavior item through the voice. Accordingly, the support ECU 44 detects the voice emitted by the driver D and recognizes the content of the voice, so that the support ECU 44 adds the behavior item expressed by the driver D to the list to be displayed on the monitor 32. For example, in a case in which the driver D requests to add "Document check", "Document check" is added to the list of the behavior items to be displayed on the monitor 32. Accordingly, the list 60B shown in FIG. 4 is changed into a list 60C, and the list 60C is displayed on the monitor 32.

Further, although an illustration is omitted in FIG. 3, in a case in which the support ECU 44 adds the behavior item, the support ECU 44 requests designation of a time to be secured as a behavior time. When the driver D tells the time to be secured to the support ECU 44, the support ECU 44 determines whether the behavior items can be finished or not within the required time to the destination.

At this time, in a case in which the support ECU 44 determines that all behavior items in the list are difficult to be finished within the required time, the support ECU 44 informs the driver D that time adjustment is difficult and requests the driver D to confirm whether there is the behavior item that can be omitted or not. At this time, for example, when the driver D tells that "News check" can be omitted through the voice, the support ECU 44 deletes "News check". Accordingly, the list 60C shown in FIG. 4 is changed into a list 60D, and the list 60D is displayed on the monitor 32.

Accordingly, when a negative determination is made in Step 104 after determining the behavior items to be performed in the required time, the confirmation is requested to the driver D in Step 112. At this time, in a case in which the driver D wants to change the performing order, the driver D tells that the performing order should be changed through the voice, and a positive determination is made in Step 114, and then the processing proceeds to Step 116.

In Step 116, the content of the change from the driver D is received. In Step 118, the order of the behavior items is changed (switched) based on the received content of the change. In Step 120, the list in which the order is changed is informed to the driver D by displaying the list on the monitor 32.

For example, in a case in which the driver D wants to firstly perform "Document check" added as a behavior item, the driver D expresses that through the voice. The support ECU 44 recognizes the voice and changes the order of the behavior items such that "Document check" is performed firstly. Accordingly, the list 60D shown in FIG. 4 is changed into a list 60E, and the list 60E is displayed on the monitor 32.

In this way, the order of the behavior items to be performed is set, and when agreement of the driver D is obtained (order change is not caused), a negative determination is made in Step 114 shown in FIG. 3, and the setting processing of the behavior items is finished.

Figure 5:
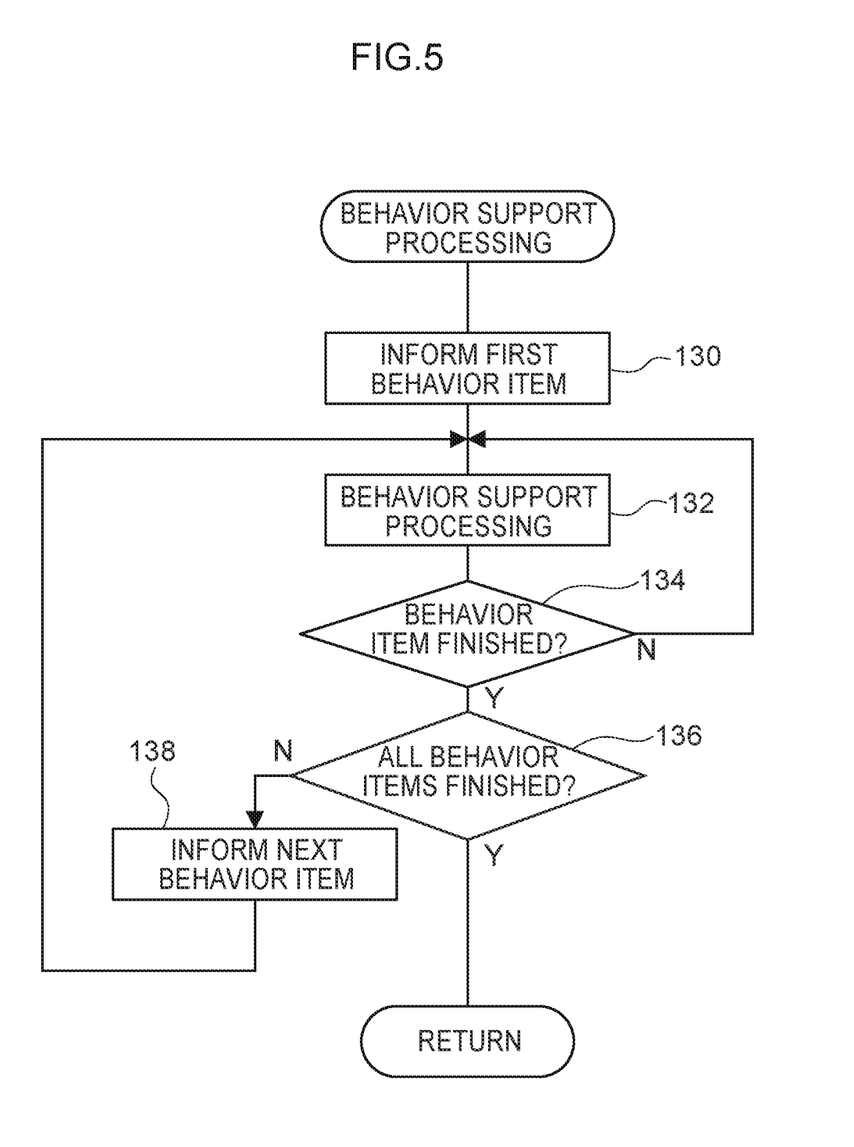
FIG. 5 is a flow chart illustrating a schematic configuration of support processing for behavior of the driver as a second step of the passenger support processing.

FIG. 5 is a flow chart illustrating a flow of the support processing for the behavior of the driver by the passenger support device 12 as a second step of the passenger support processing. The CPU 202 of the support ECU 44 reads the passenger support program from the ROM 204 or the storage portion 52, develops the program into the RAM 206 and executes the program, so that the behavior support processing is performed.

In the flow chart shown in FIG. 5, in Step 130, the first behavior item set as the behavior item to be performed is informed to the driver D. The informing of the behavior item may be performed to invite the driver D to perform the behavior item by emitting the sound from the speaker 30, and together with this, the behavior item to be performed may be displayed on the monitor 32.

In following Step 132, the behavior support processing in accordance with the action of the driver D is performed. The behavior support processing is performed by detecting the action of the driver D by using the camera 36 and predicting the intension of the driver D or the next action of the driver D based on the detected action of the driver D. Further, in the behavior support processing, the driver D may request the action to be supported through the voice (language). When the voice emitted by the driver D is detected by the microphone, the support ECU 44 recognizes the content of the request of the driver D and sets the necessary action to be supported by using the cloud 50, and the support ECU 44 supports the driver D in accordance with the request of the driver D by performing the set action.

Figure 6A:
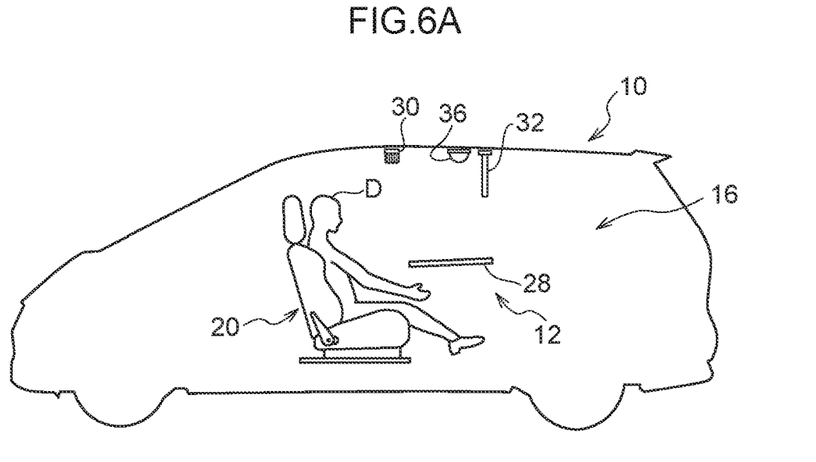
FIG. 6A is a schematic view of the vehicle in a behavior support state to the driver.

For example, in a case in which the behavior item is "Document check", as shown in FIG. 6A, the support ECU 44 positions the table 28 at the support position. Accordingly, the driver D can put the document or the like on the table 28 to check the document. When the table 28 is positioned at the support position, the driver D can write a memo or the like on the table 28. Further, when the support ECU 44 determines that lighting is necessary based on the action of the driver D imaged by the camera 36, the support ECU 44 turns on the lighting (not illustrated) to light the vicinity of the hands of the driver D or the table 28 up.

Figure 6B:
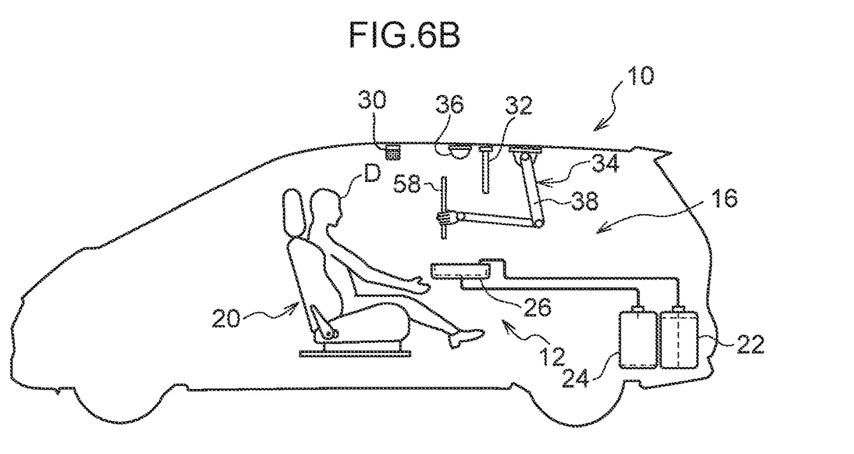
FIG. 6B is a schematic view of the vehicle in a behavior support state to the driver.

In a case in which the behavior item is "Tooth brushing" or "Face washing", as shown in FIG. 6B, the support ECU 44 positions the tray 26 at the support position. Accordingly, the driver D can use water in "Tooth brushing" or "Face washing". Further, the support ECU 44 takes a mirror 58 out from the container for small items by using the robot arm 34 to position the mirror 58 in front of the driver D. With this, the driver D can use the mirror 58 in "Tooth brushing" or "Face washing".

Further, in a case in which the behavior item is "Meal", the support in which the table 28 is positioned at the support position and food (not illustrated) is taken out from the temperature keeping storage 42 by using the robot arm 34 to put the food on the table 28 is performed. Further, in a case in which there is a beverage in the temperature keeping storage 42, the support ECU 44 takes the beverage out from the temperature keeping storage 42 by activating the robot arm 34 and puts the beverage on the table 28.

Further, in a case in which the behavior item is "News check", the support ECU 44 connects with the cloud 50 via the communication portion 48, acquires the news required by the driver D or the news suitable to the driver D, and displays the acquired news on the monitor 32. At this time, the support ECU 44 acquires a category of the news to be acquired, a keyword, or the like from the driver D in advance, and thereby the support ECU 44 can provide the driver D with the news required by the driver D or the news suitable to the driver D.

Figure 6C:
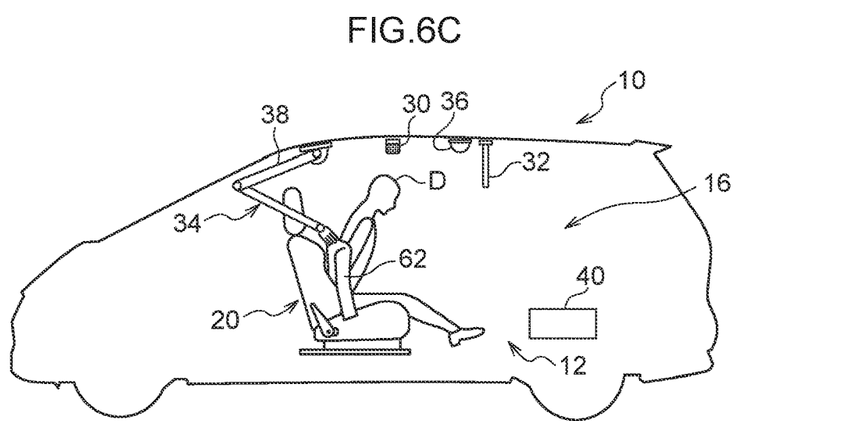
FIG. 6C is a schematic view of the vehicle in a behavior support state to the driver.

As shown in FIG. 6C, in a case in which the behavior item is "Changing clothes" to put an upper wear 62 on the driver D, the support ECU 44 takes the upper wear 62 out from the clothes case 40 by activating the robot arm 34. Further, the support ECU 44 activates the robot arm 34 to put the upper wear 62 on the driver D from a back side of the driver D. At this time, the support ECU 44 detects the action of the driver D and the action of the robot arm 34 from the image imaged by the camera 36, so that the support ECU 44 activates the robot arm 34 in accordance with the action of the driver D. Accordingly, the driver D can put an arm into a sleeve of the upper wear 62 easily so that the driver D can wear the upper wear 62 easily.

In Step 134 of the flow chart shown in FIG. 5, it is confirmed whether the performing behavior item (informed behavior item) is finished or not. Whether the behavior item is finish or not can be confirmed based on the action of the driver D detected from the image imaged by the camera 36.

When the performing behavior item is finished, a positive determination is made in Step 134 and then the processing proceeds to Step 136. In Step 136, it is confirmed whether the all behavior items to be performed are finished or not, and in a case in which the behavior item is remained, a negative determination is made in Step 136, and then the processing proceeds to Step 138 and the behavior item to be performed next is informed to the driver D to invite the driver D to perform the informed behavior item. Further, in a case in which all behavior items are finished, a positive determination is made in Step 134, and the behavior support processing for the driver D is finished.

In this way, the support ECU 44 sets the behavior items to be performed by the driver D by the time the vehicle 10 arrives at the destination and the performing order of the behavior items, and the support ECU 44 informs the driver D of the set behavior items in the set order. With this, the driver D can recognizes the behavior items to be performed appropriately and can perform the behavior items in good order.

Further, the support ECU 44 recognizes the action of the driver D performing the behavior item from the image imaged by the camera 36, and the support ECU 44 positions the tray 26 or the table 28 at the support position in accordance with the behavior item and the action of the driver D. Further, the support ECU 44 activates the robot arm 34 in accordance with the behavior item performed by the driver D and the action of the driver D. With this, in the vehicle cabin 16 having a limited space, the driver D can perform the action corresponding to the behavior item smoothly and can effectively use the time spent in the vehicle 10 travelling in the automatic driving mode.

Further, the support ECU 44 informs the driver D of the behavior item to be performed next by using the speaker 30 and the monitor 32 after performing of driver D of each behavior item. With this, the driver D can start the behavior item to be performed next without delay and can further effectively use the time spent in the vehicle 10 travelling in the automatic driving mode.

Further, the support ECU 44 informs the driver D of the behavior item to be performed by the sound emitted from the speaker 30 and the display on the monitor 32. With this, the driver D can appropriately recognize the behavior item to be performed for using the time effectively and therefore the driver D can perform the behavior item accurately.

Further, the support ECU 44 receives the addition, the removal, and the performing order of the behavior items to be performed from the driver D, and the support ECU 44 sets the behavior items to be performed in accordance with the received addition and the received removal and also sets the performing order of the behavior items. With this, the driver D can set the necessary behavior items in a necessary order and perform the set behavior items in the vehicle 10 travelling in the automatic driving mode. Further, the support ECU 44 receives the addition, the removal, and the performing order of the behavior items to be performed on an interactive basis with the driver D by using the speaker 30 and the microphone arranged in the speaker 30. With this, the driver D can easily set the addition, the removal, and the performing order of the behavior items to be performed.

Further, the support ECU 44 sets the behavior items to be performed such that the behavior items can be performed within the required time calculated by the navigation device 18. With this, the driver D can perform the behavior items to be performed by the time the vehicle 10 arrives at the destination.

Further, the support ECU 44 supports the action of the driver D by using the robot arm 34 that acts similarly to an arm and a hand of a human. With this, the driver D feels to be supported by a human, so that the driver D can perform the behavior items easily and efficiently and the driver D can use the time further effectively.

In the present embodiment described above, the set behavior items are finished by the time the vehicle 10 arrives at the destination. However, if the driver D takes a time more than a scheduled time to perform the behavior items, it is likely that not all of the set behavior items are finished by the time the vehicle 10 arrives at the destination.

Accordingly, the support ECU 44 calculates the required time from the present place of the travelling vehicle 10 to the destination and compares the calculated required time with the time until the remaining behavior items are finished. In a case in which it is predicted that the vehicle 10 arrives at the destination before the scheduled behavior items are finished, the support ECU 44 informs the driver D to invite the driver D to perform the behavior item quickly. Or alternatively, in a case in which it is predicted that the remaining behavior items can be finished by postponing the arrival time to the time designated time as the arrival limit to the destination, the navigation device 18 may research a detour to change the travelling route to the detour and the driving support device 14 may control the vehicle 10 to travel on the changed travelling route. With this, the driver D can finish the behavior items to be performed by the time the vehicle 10 arrives at the destination.

Further, in the present embodiment, the support ECU 44 receives the information such as the addition, the removal, and the change of the performing order of the behavior items to be performed on an interactive basis through the voice by using the speaker 30 with the microphone, and the monitor 32, however the present disclosure is not limited to this. For example, a touch type monitor may be adopted instead of the monitor 32 and the support ECU 44 may receive the information input through a touch operation in accordance with a U/I (user interface) displayed on the touch type monitor.

Further, in the present embodiment, the initial list of the behavior items to be performed is generated from the history stored in the storage portion 52, and the generated initial list is modified in accordance with the request of the driver D relating to a change or the like, so that the behavior items to be performed by the driver D and the performing order are set. However, the present disclosure is not limited to this. For example, the behavior items to be performed and the performing order may be received from the driver D by using an AI speaker technique, so that the driver D designates the behavior items to be performed and the performing order. At this time, the support ECU 44 determines whether the behavior items to be performed received from the driver D can be finished within the required time or not, and in a case in which it is predicted that the behavior items cannot be finished within the required time, it is preferable useful to change the behavior items to be performed on an interactive basis with the driver D.

Further, in the present embodiment, the robot arm 34 is arranged on the ceiling surface of the vehicle cabin 16, however the present disclosure is not limited to this. The robot arm may be formed, for example, by arm arranged at left and right sides of a seat back of the seat 20 on which the driver D is seated. With this, the action of the driver D can be supported from a rear side of the driver D, and therefore an action of the robot arm as a substitute of an arm (hand) of the driver D can be controlled easily. At this time, it is useful that the arm is contractible, and thereby in a state in which the driver D is seated, the arm can get an object, which is arranged at a place where the driver D cannot reach, for the driver D.

Further, in the present embodiment, the action of the driver D is supported by using the tray 26, the table 28, and the robot arm 34, however the action support portion is not limited to those. The action support portion of the present disclosure may be formed by a component that performs support necessary for the driver D when the driver D performs the behavior in accordance with the behavior item.

Further, the passenger support processing performed by the CPU 202 reading the program in the embodiment described above may be performed various processors other than the CPU. In this case, an example of the processor includes a specific electric circuit formed as a processor having a circuit configuration specifically designed for performing specific processing such as a PLD (Programmable Logic Device), and an ASIC (Application Specific Integrated Circuit) that can change the circuit configuration after manufacturing a FPGA (Field-Programmable Gate Array). Further, the passenger support processing may be performed by one of the various processors, or a combination of two or more of similar processors or different processors (for example, a combination of a plurality of the FPGAs, a combination of the CPU and the FPGA, or the like). Further, a hardware configuration of the various processors is specifically formed as an electric circuit combining circuit elements such as semiconductor element.

Further, in the embodiments described above, the passenger support program is stored (installed) in the ROM 204 or the storage portion 52, however it is not limited to this. The program may be provided by a storage medium such as a CD-ROM (Compact Disk Read Only Memory), a DVD-ROM (Digital Versatile Disk Read Only Memory), and a USB (Universal Serial Bus) memory in which the program is stored. Further, the program may be downloaded from an external device through a network.

In addition, the present disclosure can be carried out by various modifications modified within the subject matter thereof. Further, it is obvious that the scope of the present disclosure is not limited to the embodiments described above.

What is claimed is:

1. A passenger support device comprising:
   a camera;
   a processor; and
   memory storing instructions that, when executed by the processor, cause the processor to:
   set behavior items to be performed by a passenger by a time a vehicle arrives at a destination, set an order of performing the behavior items, and inform the passenger of the behavior items to be performed based on the order;
   determine that the behavior items cannot be performed by the time the vehicle arrives at the destination;
   request that the passenger confirm a behavior item can be omitted;
   remove the confirmed behavior item from the behavior items to be performed;
   analyze, using artificial intelligence, actions of the passenger performing the behavior items from images captured by the camera;
   predict, using the artificial intelligence and an analysis result, an action of the passenger performing the behavior items;
   support the predicted action of the passenger performing the behavior items, based on each of the behavior items;
   store a history of behavior items performed, a time required to perform the behavior items, and a frequency of performing the behavior items; and
   select the behavior items to be performed in order of the frequency such that performing the behavior items is finished by the time the vehicle arrives at the destination.

2. The passenger support device according to claim 1, wherein the processor indicates a behavior item to be performed next after performing each of the behavior items is finished.

3. The passenger support device according to claim 1, wherein the processor indicates each of the behavior items by display on a display medium and by sound output from a sound output portion.

4. The passenger support device according to claim 1, wherein the processor further: receives input indicating addition, removal, and a change in the order of performing the behavior items, from the passenger; and sets the behavior items to be performed and the order of performing the behavior items based on the received input.

5. The passenger support device according to claim 4, wherein the processor further acquires a required time for the vehicle to reach the destination, wherein the processor sets the behavior items to be performed such that the behavior items are finished by the required time.

6. The passenger support device according to claim 4, wherein the processor receives the input indicating addition, the removal, and the order of performing the behavior items on an interactive basis.

7. The passenger support device according to claim 1, further comprising a robot arm that supports the action of the passenger performing one of the behavior items.

8. The passenger support device according to claim 7, wherein the robot arm is activated in accordance with the behavior item and the recognized action of the passenger.

9. The passenger support device according to claim 1, wherein the processor further: receives input indicating a change in the order of performing the behavior items, without addition or removal, from the passenger; and change the order of performing the behavior items based on the received input.

10. A passenger support method, comprising:
    setting behavior items to be performed by a passenger, by a time a vehicle arrives at a destination and setting an order of performing the behavior items;
    informing the passenger of the behavior items to be performed based on the order;
    determining that the behavior items cannot be performed by the time the vehicle arrives at the destination;
    requesting that the passenger confirm a behavior item can be omitted;
    removing the confirmed behavior item from the behavior items to be performed;
    analyzing, using artificial intelligence, actions of the passenger performing the behavior items from images captured by a camera;
    predicting, using artificial intelligence and an analysis result, an action of the passenger performing the behavior items;
    supporting the predicted action of the passenger performing the behavior items, based on each of the behavior items;
    storing a history of behavior items performed, a time required to perform the behavior items, and a frequency of performing the behavior items; and
    selecting the behavior items to be performed in order of the frequency such that performing the behavior items is finished by the time the vehicle arrives at the destination.

11. The method according to claim 10, further comprising: receiving input indicating a change in the order of performing the behavior items, without addition or removal, from the passenger; and changing the order of performing the behavior items based on the received input.

12. A non-transitory storage medium that stores a program causing a computer to execute a passenger support processing, the processing comprising:
    setting behavior items to be performed by a passenger, by a time a vehicle arrives at a destination and setting an order of performing the behavior items;
    informing the passenger of the behavior items to be performed based on the order;
    determining that the behavior items cannot be performed by the time the vehicle arrives at the destination;
    requesting that the passenger confirm a behavior item can be omitted;
    removing the confirmed behavior item from the behavior items to be performed;
    analyzing, using artificial intelligence, actions of the passenger performing the behavior items from images captured by a camera; predicting, using the artificial intelligence and an analysis result, an action of the passenger performing the behavior items;
    supporting the predicted action of the passenger performing the behavior items, based on each of the behavior items;

storing a history of behavior items performed, a time required to perform the behavior items, and a frequency of performing the behavior items; and selecting the behavior items to be performed in order of the frequency such that performing the behavior items is finished by the time the vehicle arrives at the destination.

13. The non-transitory storage medium according to claim 12, wherein the processing further comprises: receiving input indicating a change in the order of performing the behavior items, without addition or removal, from the passenger; and changing the order of performing the behavior items based on the received input.

\* \* \* \* \*